(12) United States Patent
Huang et al.

(10) Patent No.: US 8,578,402 B2
(45) Date of Patent: Nov. 5, 2013

(54) FRONT PANEL OF OPTICAL DISC DRIVE

(75) Inventors: Cheng-Wen Huang, Hsinchu (TW); Chun-Lung Ho, Hsinchu (TW)

(73) Assignee: Philips & Lite-On Digital Solutions Corporation, Taipei (TW)

( * ) Notice: Subject to any disclaimer, the term of this patent is extended or adjusted under 35 U.S.C. 154(b) by 0 days.

(21) Appl. No.: 13/453,010

(22) Filed: Apr. 23, 2012

(65) Prior Publication Data

US 2013/0167164 A1     Jun. 27, 2013

(30) Foreign Application Priority Data

Dec. 26, 2011   (CN) .......................... 2011 1 0441054

(51) Int. Cl.
*G11B 17/04*     (2006.01)
(52) U.S. Cl.
USPC ......................................................... 720/646

(58) Field of Classification Search
USPC ......... 720/646, 628, 601, 648, 647, 655, 645, 720/619
See application file for complete search history.

(56) References Cited

U.S. PATENT DOCUMENTS

| | | | |
|---|---|---|---|
| 7,095,333 B2 * | 8/2006 | Graff | 340/815.4 |
| 2005/0040964 A1 * | 2/2005 | Thomas | 340/815.45 |
| 2010/0002400 A1 * | 1/2010 | Lin | 361/736 |

* cited by examiner

*Primary Examiner* — Allen T Cao
(74) *Attorney, Agent, or Firm* — WPAT, PC; Justin King

(57) ABSTRACT

A front panel of an optical disc drive is provided. The optical disc drive further includes a LED indicator for displaying a working status of the optical disc drive. The front panel includes a light-transmissible zone corresponding to the LED indicator. A thickness of the light-transmissible zone is smaller than an average thickness of the front panel. The light-transmissible zone is integrally formed with the front panel.

6 Claims, 3 Drawing Sheets

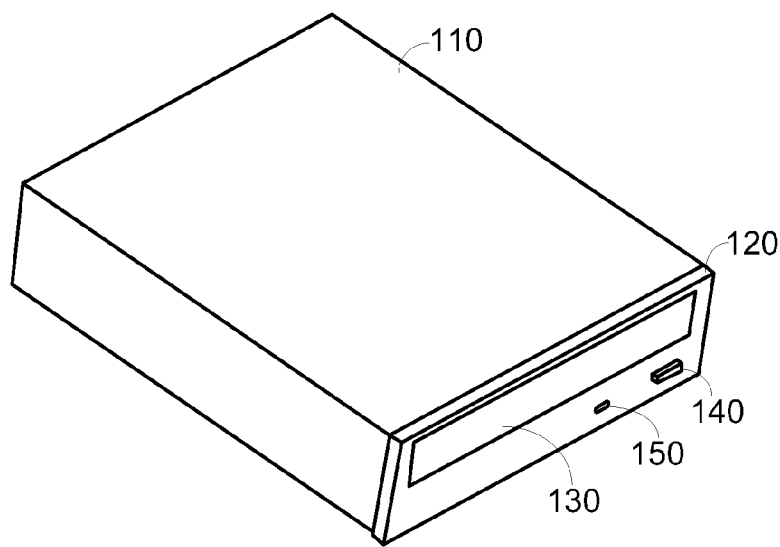
FIG. 1 (PRIOR ART)
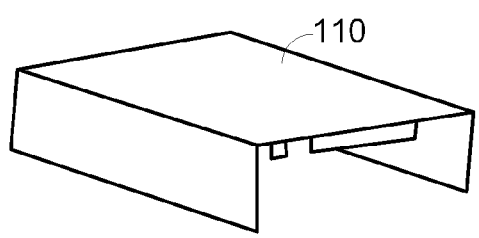
FIG. 2 (PRIOR ART)
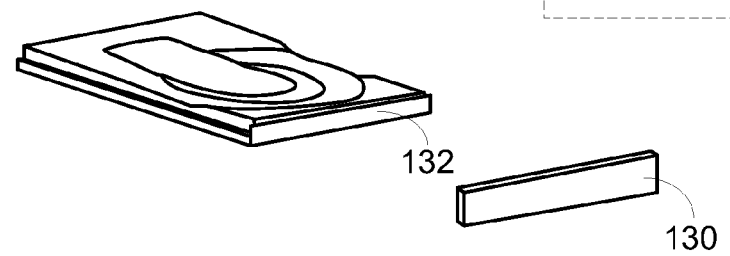
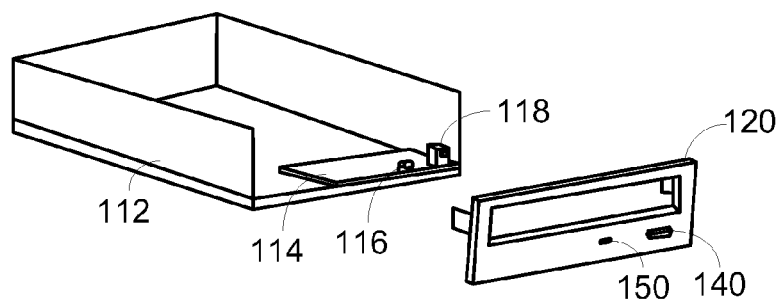

FRONT PANEL OF OPTICAL DISC DRIVE

This application claims the benefit of People's Republic of China Application Serial No. 201110441054.8, filed Dec. 26, 2011, the subject matter of which is incorporated herein by reference.

FIELD OF THE INVENTION

The present invention relates to a component of an optical disc drive, and more particularly to a front panel of an optical disc drive.

BACKGROUND OF THE INVENTION

FIG. 1 is a schematic perspective view illustrating the outward appearance of a conventional optical disc drive. As shown in FIG. 1, the conventional optical disc drive comprises an upper cover 110, a front panel 120, a tray panel 130, a control button 140, and a signal-indicating aperture 150. After the optical disc drive is installed in a computer system, only the front panel 120, the tray panel 130, the control button 140 and the signal-indicating aperture 150 are exposed.

FIG. 2 is a schematic exploded view illustrating the components within the conventional optical disc drive and relevant to the front panel. The optical disc drive has a closed space, which is defined by the upper cover 110, a lower cover 112, the front panel 120 and the tray panel 130. In addition, a spindle motor, an optical pickup head, a sled motor, a tray motor, a control circuit, and some other components are disposed within the close space of the optical disc drive. Since these components are not subject matters of the present invention, these components are not shown and described in the drawings.

Please refer to FIG. 2 again. A supporting tray 132 and the tray panel 130 are collectively defined as a tray module. The supporting tray 132 is used for supporting an optical disc (not shown). The movement of the tray module is driven by the tray motor (not shown), so that the tray module may be loaded into or ejected from the optical disc drive for loading or unloading the optical disc.

Moreover, a daughter circuit board 114 is located at a front edge of the lower cover 112. A LED indicator 116 and a control switch 118 are mounted on the daughter circuit board 114. After the front panel 120 is combined with the upper cover 110 and the lower cover 112, the LED indicator 116 is aligned with the signal-indicating aperture 150, and the control switch 118 is aligned with the control button 140.

Moreover, the control button 140 is in contact with the control switch 118. In a case that the control button 140 is pressed down by the user, the control switch 118 is triggered. Once the control switch 118 is triggered, the tray module is controlled to be moved forwardly or backwardly in order to load the optical disc or eject the optical disc. Moreover, during a data-accessing operation of the optical disc drive is performed, the LED indicator 116 emits a flickering light signal. The optical light is transmitted through the signal-indicating aperture 150, so that the working status of the optical disc drive is realized by the user. Generally, a light-guiding pillar 160 (see FIG. 3) is inserted into the signal-indicating aperture 150 for guiding the light signal. Due to the light-guiding pillar 160, the light signal from the LED indicator 116 is not directly projected onto the user's eyes, and thus the possibility of injuring the user's eyes will be minimized.

FIG. 3 schematically illustrates a front view of the conventional optical disc drive and a partial top view of an inner portion of the conventional optical disc drive. As shown in FIG. 3, an end of the control button 140 is fixed on the front panel 120. In a case that the control button 140 is not pressed down, the control button 140 is in contact with the control switch 118. When the control button 140 is pressed down, the control button 140 is moved toward the inner portion of the optical disc drive with a point A as a fulcrum, so that the control switch 118 is triggered by the control button 140. Once the control switch 118 is triggered, the tray module is controlled to be moved forwardly or backwardly in order to load the optical disc or eject the optical disc.

Please refer to FIG. 3 again. The light-guiding pillar 160 is made of a translucent plastic material. The light-guiding pillar 160 is fixed in the signal-indicating aperture 150 of the front panel 120. Due to the light-guiding pillar 160, the light signal from the LED indicator 116 is not directly projected onto the user's eyes, and thus the possibility of injuring the user's eyes will be minimized.

As is well known, the front panel 120, the light-guiding pillar 160 and the control button 140 are three different components of the conventional optical disc drive. After the front panel 120 is produced, the light-guiding pillar 160 should be additionally combined with the front panel 120 by the worker of the assembly plant of the optical disc drive. Moreover, the end of the control button 140 should be fixed on the front panel 120.

From the front view of the conventional optical disc drive, it is found that the front appearance is determined by the front panel 120, the light-guiding pillar 160, the control button 140 and the tray panel 130. These components are produced by injection processes using respective molds. After these components are produced, the light-guiding pillar 160 and the control button 140 are fixed on the front panel 120 by manpower. In other words, the process of assembling the front panel of the conventional optical disc drive is complicated.

SUMMARY OF THE INVENTION

The present invention provides a front panel of an optical disc drive, in which the process of assembling the front panel is simplified and the number of the components is reduced.

A first embodiment of the present invention provides a front panel of an optical disc drive. The optical disc drive further includes a tray for supporting an optical disc and a LED indicator for displaying a working status of the optical disc drive. The front panel includes a control button and a light-transmissible zone. The control button is used for controlling movement of the tray, thereby selectively loading or ejecting the optical disc. The light-transmissible zone is aligned with the LED indicator. A thickness of the light-transmissible zone is smaller than an average thickness of the front panel. The control button and the light-transmissible zone are integrally formed with the front panel.

A second embodiment of the present invention provides a front panel of an optical disc drive. The optical disc drive further includes a tray for supporting an optical disc and a LED indicator for displaying a working status of the optical disc drive. The front panel includes a control button and a light-transmissible zone. The control button is used for controlling movement of the tray, thereby selectively loading or ejecting the optical disc. An end of the control button is fixed on the front panel. The light-transmissible zone is aligned with the LED indicator. A thickness of the light-transmissible zone is smaller than an average thickness of the front panel. The light-transmissible zone is integrally formed with the front panel.

A third embodiment of the present invention provides a front panel of an optical disc drive. The optical disc drive further includes a LED indicator for displaying a working status of the optical disc drive. The front panel includes a light-transmissible zone corresponding to the LED indicator. A thickness of the light-transmissible zone is smaller than an average thickness of the front panel. The light-transmissible zone is integrally formed with the front panel.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 1 (prior art) is a schematic perspective view illustrating the outward appearance of a conventional optical disc drive;

FIG. 2 (prior art) is a schematic exploded view illustrating the components within the conventional optical disc drive and relevant to the front panel;

DETAILED DESCRIPTION OF PREFERRED EMBODIMENTS

The present invention provides a front panel of an optical disc drive. Except for the front panel, the configurations of other components (e.g. the upper cover 110, the lower cover 112, the daughter circuit board 114, and the tray module) are similar to those of the conventional optical disc drive, and are not redundantly described herein.

Figure 3:
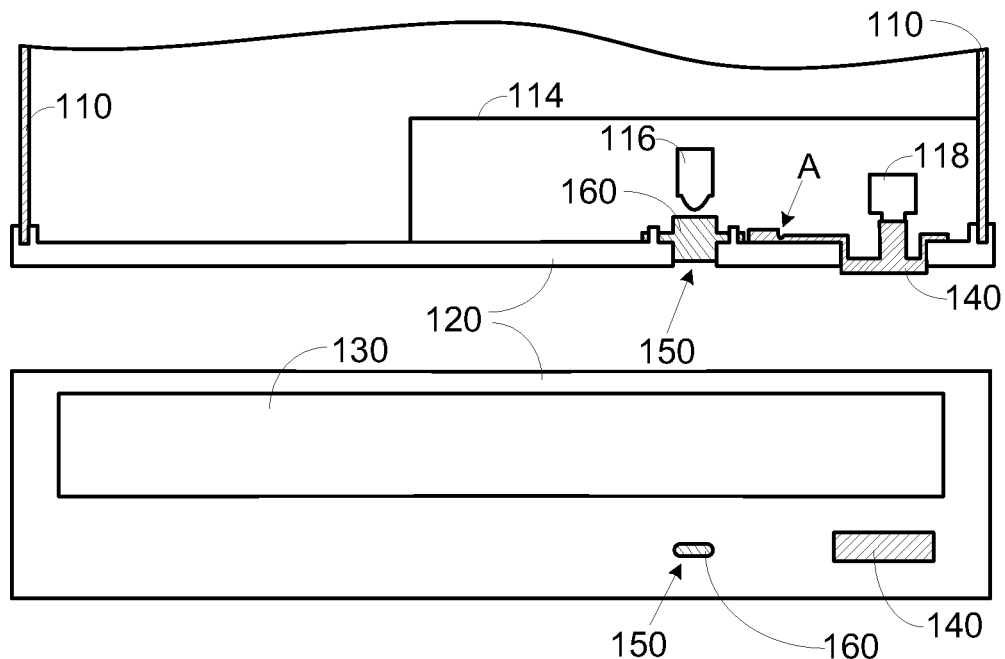
FIG. 3 (prior art) schematically illustrates a front view of the conventional optical disc drive and a partial top view of an inner portion of the conventional optical disc drive.
Figure 4:
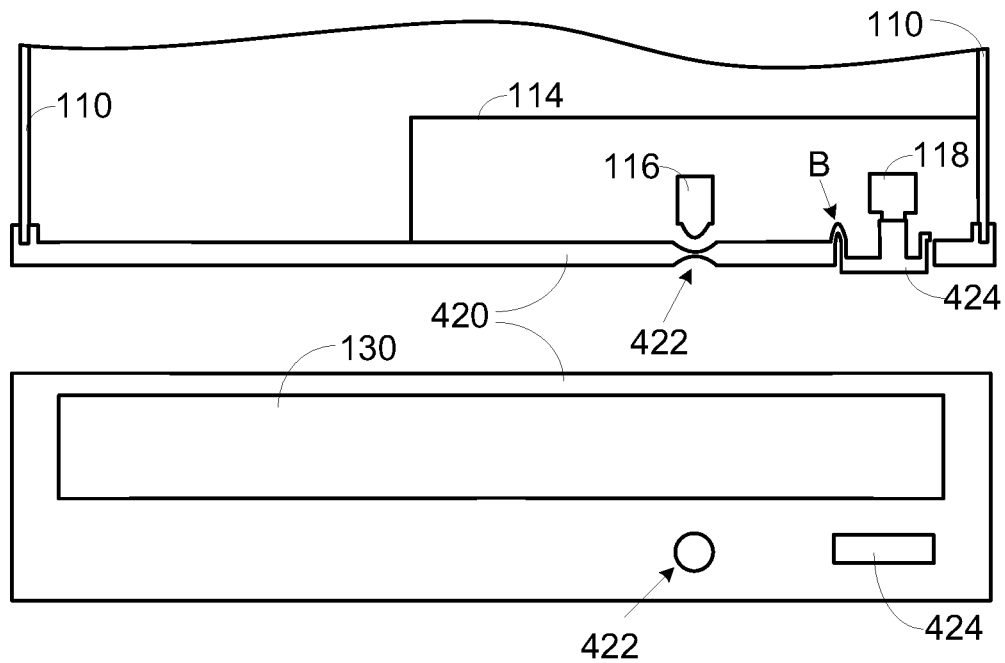
FIG. 4 schematically illustrates a front view of an optical disc drive according to a first embodiment of the present invention as well as a partial top view of an inner portion of the optical disc drive.

FIG. 4 schematically illustrates a front view of an optical disc drive according to a first embodiment of the present invention as well as a partial top view of an inner portion of the optical disc drive. In this embodiment, the front panel 420 is integrally formed by an injection molding process using a single mold.

As shown in FIG. 4, the front panel 420 comprises a light-transmissible zone 422 and a control button 424. Especially, the control button 424 is integrally formed with the front panel 420 through an elastic structure B.

In a case that the control button 424 is not pressed down, the control button 424 is in contact with the control switch 118, but the control switch 118 is not triggered by the control button 424. When the control button 424 is pressed down, the elastic structure B is subject to deformation, and the control button 424 is moved toward the inner portion of the optical disc drive to trigger the control switch 118. Once the control switch 118 is triggered, the tray module is controlled to be moved forwardly or backwardly in order to load the optical disc or eject the optical disc.

Moreover, as shown in FIG. 4, no signal-indicating aperture is formed in the front panel 420. For allowing user to view the light signal from the LED indicator 116, the light-transmissible zone 422 of the front panel 420 is aligned with the LED indicator 116. In this embodiment, the thickness of the light-transmissible zone 422 is smaller than the average thickness of the front panel 420. For example, if the average thickness of the front panel 420 is 5 mm, the thickness of the light-transmissible zone 422 is 0.5 mm.

Please refer to FIG. 4 again. Since no signal-indicating aperture is formed in the light-transmissible zone 422 of the front panel 420, the light signal from the LED indicator 116 is partially transmitted through the thinner light-transmissible zone 422 to be viewed by the user. By viewing the light signal transmitted through the light-transmissible zone 422, the working status of the optical disc drive will be realized.

As previously described in the prior art, the light-guiding pillar, the control button and the front panel of the conventional optical disc drive are discrete components. In contrast, the front panel of the optical disc drive of this embodiment is integrally formed by using a single mold. Since the process of assembling the front panel of the present invention is simplified, the fabricating cost of the optical disc drive will be effectively reduced.

Figure 5:
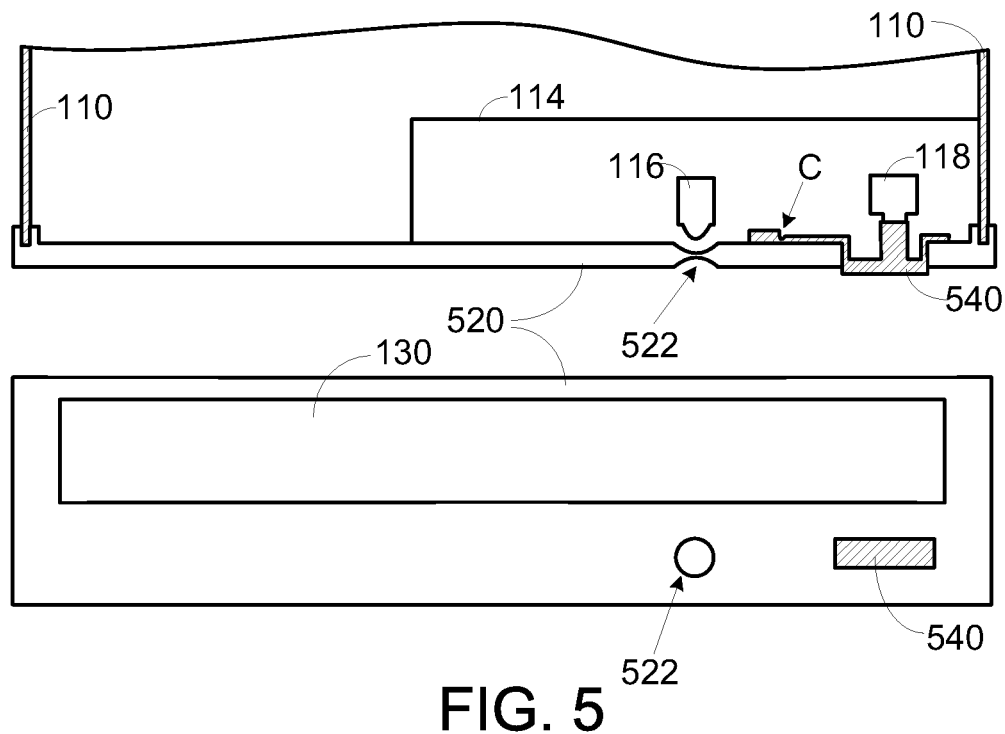
FIG. 5 schematically illustrates a front view of an optical disc drive according to a second embodiment of the present invention as well as a partial top view of an inner portion of the optical disc drive.

FIG. 5 schematically illustrates a front view of an optical disc drive according to a second embodiment of the present invention as well as a partial top view of an inner portion of the optical disc drive. In this embodiment, the front panel 520 is produced by an injection molding process using less number of molds.

As shown in FIG. 5, the front panel 520 comprises a light-transmissible zone 522 and a control button 540. The control button 540 is a discrete component. An end of the control button 540 is fixed on the front panel 520. When the control button 540 is pressed down, the control button 540 is moved toward the inner portion of the optical disc drive with a point C as a fulcrum.

In a case that the control button 540 is not pressed down, the control button 540 is in contact with the control switch 118, but the control switch 118 is not triggered by the control button 540. When the control button 540 is pressed down, the control button 540 is moved toward the inner portion of the optical disc drive to trigger the control switch 118. Once the control switch 118 is triggered, the tray module is controlled to be moved forwardly or backwardly in order to load the optical disc or eject the optical disc.

Moreover, as shown in FIG. 5, no signal-indicating aperture is formed in the front panel 520. For allowing user to view the light signal from the LED indicator 116, the light-transmissible zone 522 of the front panel 520 is aligned with the LED indicator 116. In this embodiment, the thickness of the light-transmissible zone 522 is smaller than the average thickness of the front panel 520. Please refer to FIG. 5 again. Since no signal-indicating aperture is formed in the light-transmissible zone 522 of the front panel 520, the light signal from the LED indicator 116 is partially transmitted through the thinner light-transmissible zone 522 to be viewed by the user. By viewing the light signal transmitted through the light-transmissible zone 522, the working status of the optical disc drive will be realized.

As previously described in the prior art, the light-guiding pillar, the control button and the front panel of the conventional optical disc drive are discrete components. In contrast, the front panel of the optical disc drive of this embodiment is produced by fixing the control button 540 on the front panel 520. Since the process of assembling the front panel of the present invention is simplified, the fabricating cost of the optical disc drive will be effectively reduced.

Figure 6:
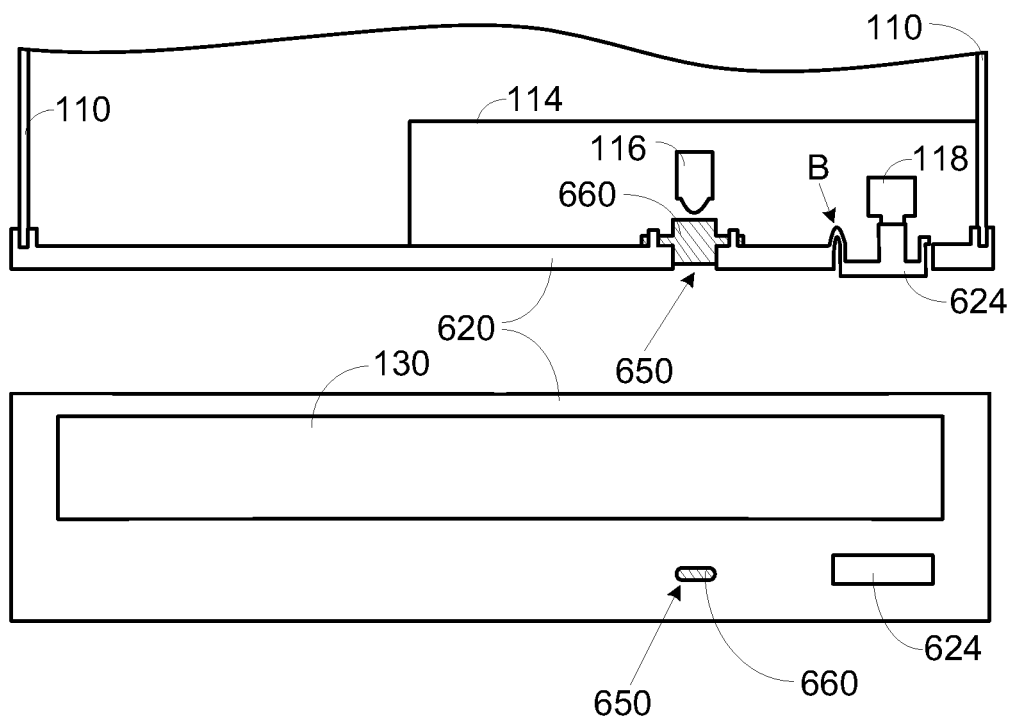
FIG. 6 schematically illustrates a front view of an optical disc drive according to a third embodiment of the present invention as well as a partial top view of an inner portion of the optical disc drive.

FIG. 6 schematically illustrates a front view of an optical disc drive according to a third embodiment of the present invention as well as a partial top view of an inner portion of the optical disc drive. In this embodiment, the front panel 620 is produced by an injection molding process using less number of molds.

As shown in FIG. 6, the front panel 620 comprises a signal-indicating aperture 650 and a control button 624. Especially, the control button 624 is integrally formed with the front panel 620 through an elastic structure B.

In a case that the control button 624 is not pressed down, the control button 624 is in contact with the control switch 118, but the control switch 118 is not triggered by the control button 624. When the control button 624 is pressed down, the elastic structure B is subject to deformation, and the control button 624 is moved toward the inner portion of the optical disc drive to trigger the control switch 118. Once the control switch 118 is triggered, the tray module is controlled to be moved forwardly or backwardly in order to load the optical disc or eject the optical disc.

Moreover, a light-guiding pillar 660 is fixed in the signal-indicating aperture 650 of the front panel 620. The light signal from the LED indicator 116 is partially transmitted through the light-guiding pillar 660 to be viewed by the user. By viewing the light signal transmitted through the light-guiding pillar 660, the working status of the optical disc drive will be realized.

As previously described in the prior art, the light-guiding pillar, the control button and the front panel of the conventional optical disc drive are discrete components. In contrast, the front panel of the optical disc drive of this embodiment is produced by fixing light-guiding pillar 660 in the signal-indicating aperture 650 of the front panel 620. Since the process of assembling the front panel of the present invention is simplified, the fabricating cost of the optical disc drive will be effectively reduced.

From the above description, since the front panel of the optical disc drive of the present invention is assembled by using less number of components, the assembling process is simplified and the fabricating cost is reduced. The above embodiments are illustrated by referring to the front panel of the half-height optical disc drive. Nevertheless, the concepts of the present invention may be also applied to the front panel of the slim-type optical disc drive.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical disc drive comprises a front panel, a tray for supporting an optical disc and a LED indicator for displaying a working status of the optical disc drive, wherein the front panel comprising:
   a control button for controlling movement of the tray, thereby selectively loading or ejecting the optical disc; and
   a light-transmissible zone aligned with the LED indicator, wherein a thickness of the light-transmissible zone is smaller than an average thickness of the front panel, wherein the control button and the light-transmissible zone are integrally formed with the front panel.

2. The front panel as claimed in claim 1, wherein the control button is connected to the front panel through an elastic structure, wherein the elastic structure and the control button are integrally formed with the front panel.

3. The front panel as claimed in claim 1, wherein a light signal emitted by the LED indicator is partially transmitted through the light-transmissible zone.

4. An optical disc drive comprises a front panel, a tray for supporting an optical disc and a LED indicator for displaying a working status of the optical disc drive, wherein the front panel comprising:
   a control button for controlling movement of the tray, thereby selectively loading or ejecting the optical disc, wherein an end of the control button is fixed on the front panel; and
   a light-transmissible zone aligned with the LED indicator, wherein a thickness of the light-transmissible zone is smaller than an average thickness of the front panel, wherein the light-transmissible zone is integrally formed with the front panel.

5. An optical disc drive comprises a front panel, a LED indicator for displaying a working status of the optical disc drive, wherein the front panel comprising a light-transmissible zone corresponding to the LED indicator, wherein a thickness of the light-transmissible zone is smaller than an average thickness of the front panel, and the light-transmissible zone is integrally formed with the front panel.

6. The front panel as claimed in claim 5, wherein a light signal emitted by the LED indicator is partially transmitted through the light-transmissible zone.

\* \* \* \* \*